United States Patent [19]
Haage et al.

[11] Patent Number: 5,431,516
[45] Date of Patent: Jul. 11, 1995

[54] EXPANSIBLE PLUG

[75] Inventors: Manfred Haage, Dornstetten-Aach; Werner Heinzelmann, Freudenstadt, both of Germany

[73] Assignee: fischerwerke, Artur Fischer GmbH & Co. KG, Waldachtal, Germany

[21] Appl. No.: 237,178

[22] Filed: May 3, 1994

[30] Foreign Application Priority Data

May 21, 1993 [DE] Germany ............ 43 07 039.0

[51] Int. Cl.6 .................................. F16B 13/06
[52] U.S. Cl. .............................. 411/55; 411/32; 411/60
[58] Field of Search .............. 411/21, 32, 33, 55, 411/57, 60

[56] References Cited

U.S. PATENT DOCUMENTS

| 2,147,357 | 2/1939 | Scholtes | 411/33 |
| 5,143,497 | 9/1992 | Haage | 411/21 X |
| 5,288,189 | 2/1994 | Hepworth | 411/32 |

FOREIGN PATENT DOCUMENTS

| 41207 | 8/1985 | Austria. | |
| 1859781 | 10/1962 | Germany. | |
| 1450998 | 10/1973 | Germany. | |
| 3017108 | 11/1981 | Germany | 411/21 |
| 3241158 | 5/1984 | Germany | 411/32 |
| 3329502 | 3/1985 | Germany. | |
| 2334763 | 4/1987 | Germany. | |
| 3912749 | 10/1990 | Germany. | |
| 3917498 | 12/1990 | Germany. | |
| 4026944 | 2/1992 | Germany. | |

Primary Examiner—Neill R. Wilson
Attorney, Agent, or Firm—Michael J. Striker

[57] ABSTRACT

An expansible plug comprises a closed shank section formed as a shank sleeve provided with a screw channel and a longitudinal divided expansible shank, the shank being formed by two shank halves provided with staggered expansible elements which interlock to form a closed expansion region, the expansible elements being offset relative to one another and having bores arranged eccentrically relative to a center line of the expansible shank and overlapping so that an overlapping region forms a constricted screw channel, the expansion region tapering conically toward a plug tip, and one of the shank halves being connected to the shank sleeve in a joining region by a secure joint.

9 Claims, 3 Drawing Sheets

EXPANSIBLE PLUG

BACKGROUND OF THE INVENTION

The present invention relates to an expansible plug

More particularly, it relates to an expansible plug which has a closed shank section composed of two shank halves and an expanding element for expanding the shank sleeve.

Expansible plugs of the above mentioned general type are known in the art. One such expansible plug is disclosed for example in the German document DE-A1 40 26 944. The expansible plug disclosed in this document has an expansible shank divided into two in the longitudinal direction and disc-shaped elements project inwards from both sections of the shank and overlap one another to form a closed expansible shank with a cylindrical outer surface. The disc-shaped expansible elements are provided with eccentrical bores with align coaxially when a fixing screw is screwed in to laterally displace the expansible elements. This process can be identified as an expansion process since the outer surface of the expansion region of the shank is consequently widened or expanded. Such an expansible plug has universal application and achieves high holding values not only in solid building materials but also in hollow building materials. The expansible elements arranged over a relatively long length of the expansible part provide a uniform expansion over the entire expansion region. When used in a hollow building material, the projecting disc-shaped expansible elements engage the cavities so that an interlocking engagement in the masonry is obtained in each bounding wall of a cavity.

When the expansible plug of the above mentioned type is used in solid building materials and in some cases also when it is used in hollow building materials, it may become braced slightly in a drilled hole after only a relatively short penetration depth. As a result it can snap off at the top end of the expansion region outside the drilled hole. Under unfavorable circumstances the expansible plug which already has been driven fully into a drilled hole can also rotate with a fixing screw as the fixing screw is being screwed in. As a result the screwing-in and the expansion of the expansible plug are rendered particularly difficult.

SUMMARY OF THE INVENTION

Accordingly, it is an object of the present invention to provide an expansible plug which avoids the disadvantages of the prior art.

In keeping with these objects and with others which will become apparent hereinafter, one feature of the present invention resides, briefly stated, in an expansible plug of the above mentioned general type in which the expansion region tapers conically toward the plug tip and there is a secure joint in the joining region between one shank half and the shank sleeve of the plug.

When the expansible plug is designed in accordance with the present invention it does not snap off as it is being driven through or into a bore.

The conical tapering of the expansion region toward the plug tip considerably facilitates driving of the expansible plug into a drilled hole. The slightly reduced shank diameter in the conical region has, however, virtually no influence on the holding values that can be achieved, since the expansible elements are displaced laterally as a fixing screw is screwed in, or a comparatively long path which can be many times greater than the reduction in diameter in the conical region. The conical tapering of the expansion region enables the expansible plug to insert it with relatively little resistance to a greater penetration depth into a drilled hole. The expansible plug is therefore stabilized in the drilled hole over a relatively long length and therefore it has less tendency to snap off. In addition, the shank halves that form the expansion region are fixedly joined to the shank sleeve leading toward the plug opening. Therefore it is precisely this critical transition region between the shank sleeve and the expansion region that improved rigidity is achieved for the expansible plug.

In accordance with the present invention the expansible plug is preferably manufactured as a plastic material part in a single injection molding operation and the two shank halves are joined to one another by an injection molded web in the region of the plug tip. After the injection molding operation, one shank half has to be folded onto the other shank half, which is joined to the shank sleeve by a dovetail joint providing proof against rotation, bending and tension. Instead of a dovetailed joint a different interlocking connection, or of course also an adhesive or welded connection can be used. An expansible plug of this connection is inexpensive to manufacture and nevertheless has the required stability as it is being driven into a drilled hole.

In accordance with still a further feature of the present invention, the expansible plug has outwardly projecting longitudinal ribs which provide additional longitudinal stiffening in the transition region between the shaft sleeve and a shank section of the expansion region. It forms anti-rotation elements at the expansion region and at the upper closed section of the shank (shank sleeve). The longitudinal ribs may be offset with respect to their longitudinal position and with respect to their angular position at the circumference, so that insertion of the expansible plug into a drilled hole can be facilitated.

In accordance with still another feature of the present invention, an impact barrier formed as an annular collar engaging in a thread of a partially inserted fixing screw can be provided in the shaft sleeve. The expansible sleeve with a pre-mounted fixing screw can be driven into a drilled hole by the fixing screw, and the transfer of force to the expansible plug is effected by the impact barrier. The fixing screw is preferably inserted into the expansible plug sufficiently far for the tip of the screw to project slightly into the expansion region but to expand this. This position of the screw therefore reinforces the expansible plug in its upper region, so that the plug snapping off here is reliably prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
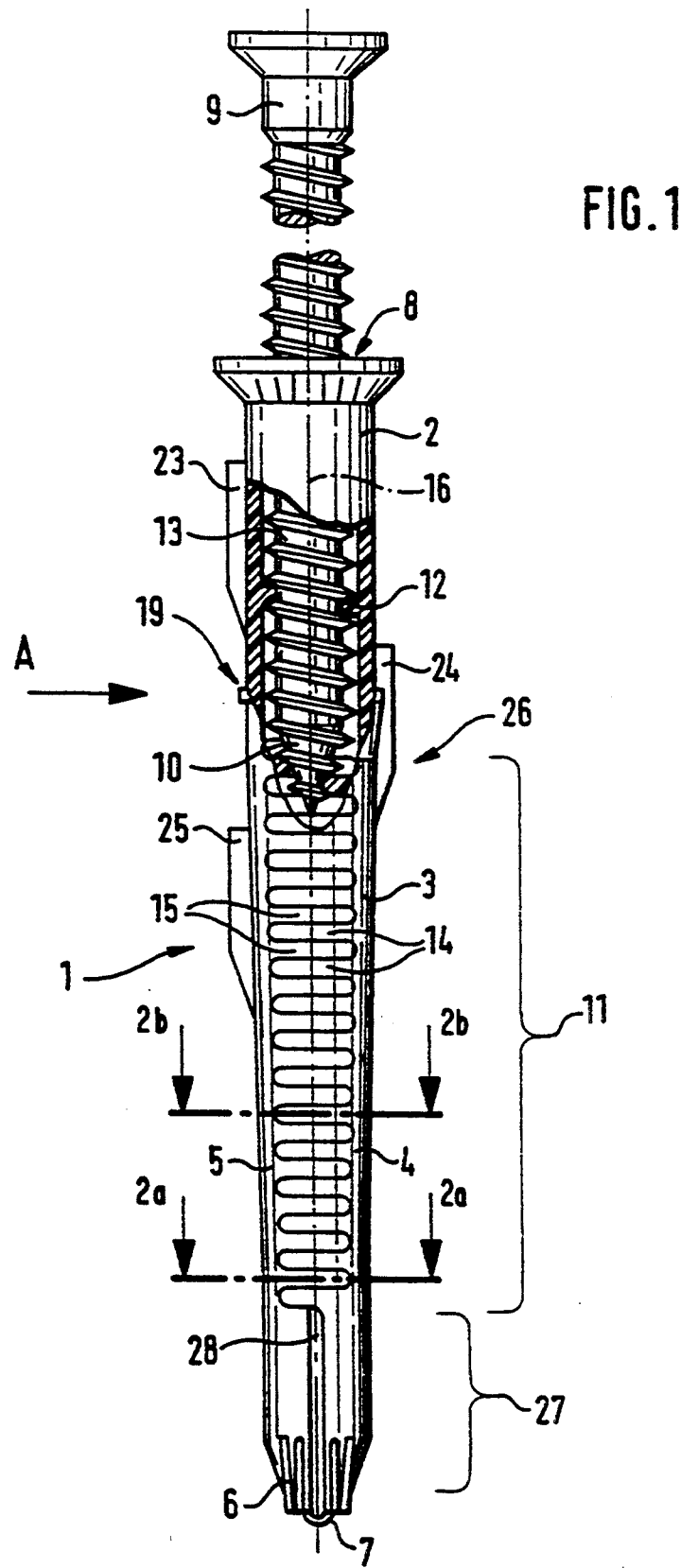
FIG. 1 is a view showing an expansible plug with a pre-mounted fixing screw in accordance with the present invention.

An expansible plug in accordance with the present invention is identified in FIG. 1 as a whole with reference numeral 1. The expansible plug has a shank sleeve 2 and an expansible shank 3 joined to the sleeve. The expansible shank 3 is divided longitudinally into a right-hand shank section 4 and a left-hand section 5. The expansible plug is preferably made as an integral injection molded plastic part. The shank sections 4 and 5 are joined to one another in the region of a plug tip 6 by an injection molded web 7.

The expansible plug further includes a fixing screw which is screwed into a plug opening provided in the shank sleeve 2 so that a tip 10 of the fixing screw projects slightly into the expansion region 11. The expansible plug is provided with an impact barrier 12. The impact barrier is formed as an annular collar which projects inwardly from the shank sleeve 2 and engages in a thread 13 of the fixing screw 9.

Figure 2A:
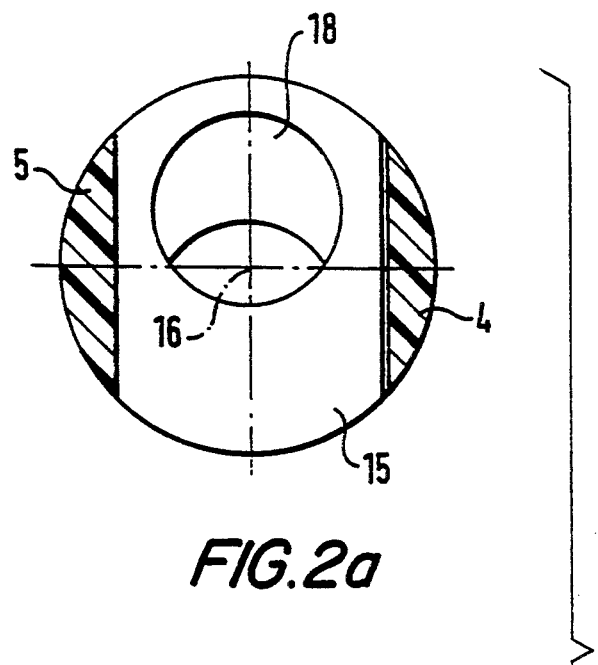
FIGS. 2A and 2B are views showing sections taken along the lines 2A—2A and 2B—2B in FIG. 1.
Figure 2B:
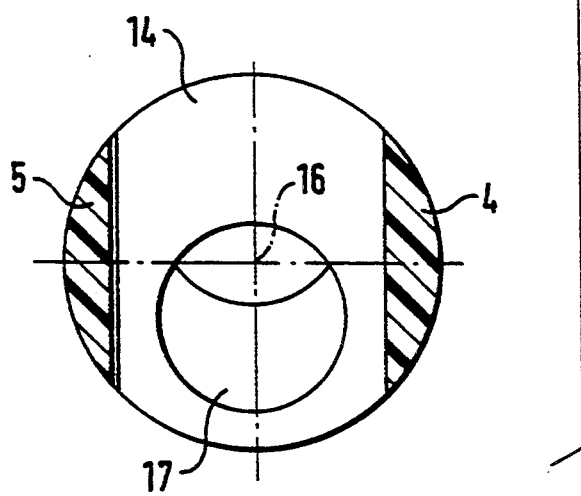

The expansion region 11 of the expansible shank is formed by expansible elements 14 and 15 which project from the shank parts 4 and 5 like teeth of a comb. In expansible element has a bore 17, 18. The bores are shown in FIG. 2 and arranged concentrically with respect to a center line 16 of the expansible plug.

When the fixing screw 9 is screwed-in toward the plug tip 6 through the entire expansion region 11, the eccentrically arranged bores 17 and 18 are coaxially aligned. As a result, the expansible elements 14 and 15 are displaced substantially perpendicularly to the plane of the drawing of FIG. 1. This is described in detail in the German document DE-A1 40 26 944 which is incorporated by reference.

One shank section 4 is connected in one piece with the shank sleeve 2. The other shank section 5 is fixedly joined by additional fixing elements in the joining region 19 shown in FIGS. 3-5.

Figure 3:
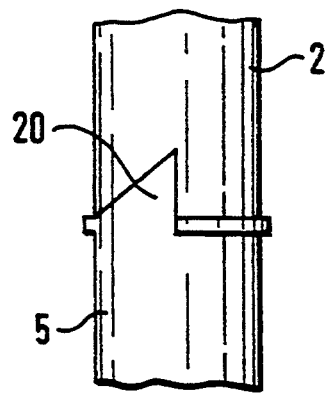
FIGS. 3-5 are views showing three different types of joints in the region A of joining between a left shank section of an expansion region and an upper shank sleeve of the inventive expansible plug.

In the construction shown in FIG. 3 the joining is performed by an interlocking configuration 20. The configuration is suitable for transferring rotary torque between the shank section 4 and the shank sleeve 2.

Figure 4:
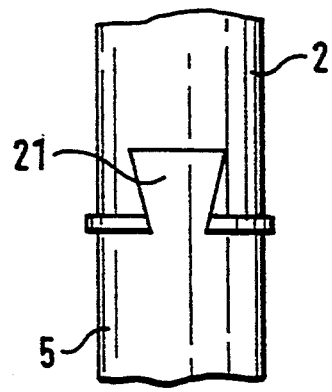

In the embodiment shown in FIG. 4 the joining is performed by a dovetail joint 21. The joint is formed to transfer tension, bending and rotary torque forces.

Figure 5:
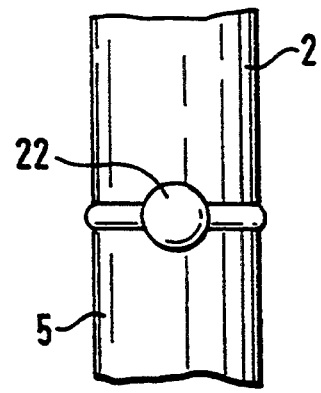

Finally, in the embodiment shown in FIG. 5 the joining is performed by a welded joint 22. The shank sleeve 2 and the shank section 5 are permanently joined with one another by the welded joint.

In the inventive expansible plug, a plurality of longitudinal ribs 23, 24, 25 are arranged at intervals on the plug, as shown in FIG. 1. The longitudinal rib 24 additionally reinforces the transitional region between the shank sleeve 23 and the shank section 3.

An additional expansible portion 27 can be formed by a slot 28 in the region of the plug tip 6. The expansion direction of the additional expansible portion 27 is oriented at 90° to the expansion direction of the expansion region 11.

In accordance with an important feature of the present invention, the expansion region 11 has a slight conical taper toward the plug tip 6. The expansible portion 27 can then have a cylindrical outer surface again.

It will be understood that each of the elements described above, or two or more together, may also find a useful application in other types of constructions differing from the types described above.

While the invention has been illustrated and described as embodied in an expansible plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An expansible plug, comprising a closed shank section formed as a shank sleeve provided with a screw channel and a longitudinally divided expansible shank, said shank being formed by two shank halves provided with staggered expansible elements which interlock to form a closed expansion region, said expansible elements being offset relative to one another and having bores arranged eccentrically relative to a center line of the expansible shank and overlapping so that an overlapping region forms a constricted screw channel, said expansion region tapering conically toward a plug tip, and one of said shank halves being connected to said shank sleeve in a joining region by a secure joint, said shank sleeve and said one shank half forming a one-piece plastic part, wherein another of said shank halves is connected with said shank sleeve to form a one-piece plastic element, said one shank half being connected to said shank sleeve by a dovetailed joint which forms said secured joint, in a manner proof against rotation, bending and tension.

2. An expansible plug, comprising a closed shank section formed as a shank sleeve provided with a screw channel and a longitudinally divided expansible shank, said shank being formed by two shank halves provided with staggered expansible elements which interlock to form a closed expansion region, said expansible elements being offset relative to one another and having bores arranged eccentrically relative to a center line of the expansible shank and overlapping so that an overlapping region forms a constricted screw channel, said expansion region tapering conically toward a plug tip, and one of said shank halves being connected to said shank sleeve in a joining region by a secure joint, said shank sleeve and said one shank half form a one-piece plastic part, wherein another of said shank halves is connected with said shank sleeve to form a one-piece plastic element, said one shank half being connected to said shank sleeve by an interlocking joint which forms said secured joint, in a manner proof against rotation, bending and tension.

3. An expansible plug, comprising a closed shank section formed as a shank sleeve provided with a screw channel and a longitudinally divided expansible shank, said shank being formed by two shank halves provided with staggered expansible elements which interlock to form a closed expansion region, said expansible elements being offset relative to one another and having bores arranged eccentrically relative to a center line of the expansible shank and overlapping so that an overlapping region forms a constricted screw channel, said expansion region tapering conically toward a plug tip, and one of said shank halves being connected to said shank sleeve in a joining region by a secure joint; and a plurality of ribs projecting respectively from said shank sleeve and from said two shank halves which form said expansion region, so as to form an anti-rotation elements.

4. An expansible plug as defined in claim 3, wherein said longitudinal ribs are offset relative to one another in the longitudinal direction and also in an angular direction.

5. An expansible plug as defined in claim 3, wherein said longitudinal ribs include a first longitudinal rib arranged at a transition region between said shank sleeve and said one shank half.

6. An expansible plug, comprising a closed shank section formed as a shank sleeve provided with a screw channel and a longitudinally divided expansible shank, said shank being formed by two shank halves provided with staggered expansible elements which interlock to form a closed expansion region, said expansible elements being offset relative to one another and having bores arranged eccentrically relative to a center line of the expansible shank and overlapping so that an overlapping region forms a constricted screw channel, said expansion region tapering conically toward a plug tip, and one of said shank halves being connected to said shank sleeve in a joining region by a secure joint; and a further expansible region formed at said plug tip and having an expansion direction which is offset relative to an expansion direction of said expansible region by 90°.

7. An expansible plug comprising a closed shank section formed as a shank sleeve provided with a screw channel and a longitudinally divided expansible shank, said shank being formed by two shank halves provided with staggered expansible elements which interlock to form a closed expansion region, said expansible elements being offset relative to one another and having bores arranged eccentrically relative to a center line of the expansible shank and overlapping so that an overlapping region forms a constricted screw channel, said expansion region tapering conically toward a plug tip, and one of said shank halves being connected to said shank sleeve in a joining region by a secure joint, said shank sleeve and said shank halves together forming a one-piece injection molded plastic element which includes an injection molded web connecting said shank halves with one another at said plug tip.

8. An expansible plug as defined in claim 7; and further comprising an impact barrier projecting from said shank sleeve for a fixing screw insertable in said shank sleeve.

9. An expansible plug as defined in claim 8, wherein said impact barrier is formed as an annular collar.

* * * * *